United States Patent
White, II (10) Patent No.: US 12,544,272 B2
(45) Date of Patent: Feb. 10, 2026

(54) WOUND CLOSURE TREATMENT SYSTEM

(71) Applicant: Locke White, II, Blacksburg, VA (US)

(72) Inventor: Locke White, II, Blacksburg, VA (US)

( * ) Notice: Subject to any disclaimer, the term of this patent is extended or adjusted under 35 U.S.C. 154(b) by 238 days.

(21) Appl. No.: 18/235,662

(22) Filed: Aug. 18, 2023

(65) Prior Publication Data

US 2024/0082063 A1  Mar. 14, 2024

Related U.S. Application Data

(60) Provisional application No. 63/474,723, filed on Sep. 12, 2022, provisional application No. 63/474,473, filed on Aug. 19, 2022.

(51) Int. Cl.
*A61B 17/12* (2006.01)
*A61F 13/00* (2006.01)
*A61F 13/02* (2006.01)

(52) U.S. Cl.
CPC ........ *A61F 13/00051* (2013.01); *A61B 17/12* (2013.01); *A61F 13/0269* (2013.01); *A61B 2017/12004* (2013.01); *A61F 2013/0028* (2013.01)

(58) Field of Classification Search
CPC . A61B 17/1325; A61B 17/1327; A61B 17/12; A61B 17/085; A61B 2017/12004; A61F 13/0269; A61F 2013/0028
See application file for complete search history.

(56) References Cited

U.S. PATENT DOCUMENTS

| | | | | |
|---|---|---|---|---|
| 34,112 | A * | 1/1862 | Lambert | A61B 17/1327 24/186 |
| 3,570,496 | A * | 3/1971 | Sachs | A61B 17/1325 606/203 |
| 3,983,878 | A * | 10/1976 | Kawchitch | A61B 17/085 606/216 |
| 5,628,723 | A * | 5/1997 | Grau | A61B 17/1325 602/53 |
| 2004/0243044 | A1* | 12/2004 | Penegor | A61L 15/58 602/48 |
| 2009/0281565 | A1* | 11/2009 | McNeese | A61B 17/1325 606/201 |
| 2010/0217202 | A1* | 8/2010 | Clark | A61B 17/0057 604/227 |
| 2015/0012037 | A1* | 1/2015 | Goldman | A61B 17/1325 606/216 |

(Continued)

Primary Examiner — Alexander J Orkin (57) ABSTRACT

A wound closure treatment system includes a dressing member having an at least partially hard or rigid body, the body having a base portion and one or more wings extending upwardly from the base portion. The base portion has a top surface and a bottom surface. The dressing member is positionable atop a wound to be closed in a pressure application configuration where the bottom surface is adapted to apply pressure to the wound to help stop bleeding of the wound. The dressing member is also positionable atop the wound to be closed in a protection configuration where the top surface faces the wound in a manner where the dressing member protects the wound during healing. In one version, the wings are bendable relative to the base portion to cause the base portion to apply pressure to the wound. A method of using the wound closure treatment system is also disclosed.

20 Claims, 8 Drawing Sheets (56) References Cited

U.S. PATENT DOCUMENTS

| | | | | |
|---|---|---|---|---|
| 2015/0305751 | A1* | 10/2015 | Hoff | A61B 17/1325 |
| | | | | 606/202 |
| 2016/0038154 | A1* | 2/2016 | Cohen | A61B 17/135 |
| | | | | 606/202 |
| 2019/0343688 | A1* | 11/2019 | Giger | A61L 15/26 |

* cited by examiner

WOUND CLOSURE TREATMENT SYSTEM

PRIORITY

The present application claims the benefit of domestic priority based on U.S. Provisional Patent Application 63/474,473 filed on Aug. 19, 2022, and on U.S. Provisional Patent Application 63/474,723 filed on Sep. 12, 2022, the entireties of both of which are incorporated herein by reference.

BACKGROUND

Anyone who has ever had sutures or other type of wound closure knows they can be a little scary. Whether it is from surgery or from an accident, such as a mishap with a knife, there can be a lot of disturbing blood.

Sutures or other type of wound closure are typically covered with a dressing. If the wound is on an extremity, such as an arm or leg, and requires a visit to an emergency room, the physician or other caregiver will often apply a pressure dressing over the sutures or other wound closure. The application of pressure can help stop bleeding at the wound site. Conventionally, this pressure dressing will consist of one or more layers of gauze being placed over the wound closure and then an elastic ACE-type wrap being applied around the extremity and over the wound closure. The wrap is tightened to help stop bleeding. The problem with this process, though, is that the wrap can be applied too tightly and can result in discomfort and/or the cutting off of circulation to the fingers or toes. Another problem with this process is that the pressure dressing might get applied too loosely. In this case, it can do a poor job of stopping the bleeding, which can result in the need for additional wound cleaning and can lead to patient anxiety.

The tightness of the wrap must be approximated by the physician or caregiver. Typically, the physician or caregiver will apply the wrap to a patient's arm and then press on a patient's finger tips to see how fast the color returns as a gauge for the adequacy of the tightness. This method, of course, requires experience on the part of the physician or caregiver and assumes otherwise perfect health on the part of the patient. This process can also result in a time consuming process of having the unwrap and start again. Even when applied correctly, the use of an elastic wrap around an entire extremity is not ideal since pressure is having to be applied to areas where it is not needed.

The treatment of a wound closure is also challenging when the wound is located somewhere other than on an extremity. For example, it is difficult to apply sufficient pressure using a pressure wrap to wounds that are on the head or torso. Such wounds can result from injuries in those areas or from medical procedures, such as Mohs surgery to remove lesions or C-sections during childbirth. Typically, these wound closures are treated by merely the application of adhesive tape over layers of gauze. This technique often does not apply sufficient pressure to quickly stop bleeding and requires frequent replacement with fresh dressing. Often the physician or caregiver will instruct a patient to apply gentle pressure with their hands, but this can be painful, cumbersome, tiring, and inexact. Many patients are also squeamish about putting their hand on and pressing down on what was once an open wound.

In addition to the problems of conventional wound closure dressings associated with their application of pressure, these dressings suffer from additional problems. For example, soft dressings do not provide long term protection for the wound closure that can help prevent reopening of the wound in certain situations. For example, accidental blows can cause sutures to be popped open. As a result, a patient often will avoid certain activities where there is a risk of such blows and/or live with the fear of a return visit to the physician or caregiver.

There is therefore a need for an improved system and method for treating a wound closure. There is further a need for a wound closure treatment system that applies pressure to a wound closure in an improved manner. There is further a need for a wound closure treatment system that provides consistent and/or known pressure to a wound closure. There is further a need for a wound closure treatment system that provides protection to wound closure site.

SUMMARY

The present invention satisfies these needs. In one aspect of the invention, an improved wound closure treatment system and method is provided.

In another aspect of the invention, a wound closure treatment system provides pressure to a wound closure in an improved manner.

In another aspect of the invention, a wound closure treatment system provides pressure to a wound closure in a consistent and/or known amount of pressure.

In another aspect of the invention, a wound closure treatment system provides protection to a wound closure site.

In another aspect of the invention, a wound closure treatment system provides protection to a wound closure site both during the initial closure of the wound and during extended healing of the wound.

In another aspect of the invention, a wound closure treatment system is positionable in a pressure application configuration to help stop bleeding of a wound closure and is positionable in a protection configuration to protect the wound closure site during extended healing of the wound.

In another aspect of the invention, a wound closure treatment method provides pressure to a wound closure in an improved manner.

In another aspect of the invention, a wound closure treatment method provides pressure to a wound closure in a consistent and/or known amount of pressure.

In another aspect of the invention, a wound closure treatment method provides protection to a wound closure site.

In another aspect of the invention, a wound closure treatment method provides protection to a wound closure site both during the initial closure of the wound and during extended healing of the wound.

In another aspect of the invention, a wound closure treatment method comprises positioning a wound closure treatment device in a pressure application configuration to help stop bleeding of a wound closure and positioning the wound treatment closure device in a protection configuration to protect the wound closure site during extended healing of the wound.

In another aspect of the invention, a wound closure treatment system comprises a dressing member comprising an at least partially hard or rigid body, the body comprising a base portion and one or more wings extending upwardly from the base portion, the base portion having a top surface and a bottom surface, wherein the dressing member is positionable atop a wound to be closed in a pressure application configuration where the bottom surface is adapted to apply pressure to the wound to help stop bleeding of the wound, and wherein the dressing member is positionable atop the wound to be closed in a protection configuration where the top surface faces the wound in a manner where the dressing member protects the wound during healing.

In another aspect of the invention, a wound closure treatment system comprises a dressing member comprising an at least partially hard or rigid body, the body comprising a base portion and one or more wings extending upwardly from the base portion, the base portion having a top surface and a bottom surface, wherein the dressing member is positionable atop a wound to be closed in a pressure application configuration where the bottom surface is adapted to apply pressure to the wound to help stop bleeding of the wound, and wherein the dressing member is positionable atop the wound to be closed in a protection configuration where the top surface faces the wound in a manner where the dressing member protects the wound during healing, wherein the one or more wings comprises a set of two wings opposed from one another.

In another aspect of the invention, a wound closure treatment system comprises a dressing member comprising an at least partially hard or rigid body, the body comprising a base portion and one or more wings extending upwardly from the base portion, the base portion having a top surface and a bottom surface, wherein the dressing member is positionable atop a wound to be closed in a pressure application configuration where the bottom surface is adapted to apply pressure to the wound to help stop bleeding of the wound, and wherein the dressing member is positionable atop the wound to be closed in a protection configuration where the top surface faces the wound in a manner where the dressing member protects the wound during healing, wherein the one or more wings extend upwardly and outwardly from the base portion at an angle relative to the base portion of from about 10 degrees to about 85 degrees when the dressing member is not pressured and wherein the one or more wings are bendable to a different angle when the dressing member is in a position where is applies pressure to the wound.

In another aspect of the invention, a wound closure treatment system comprises a dressing member comprising an at least partially hard or rigid body, the body comprising a base portion and a set of two wings opposed from one another and extending upwardly and outwardly from the base portion at a first angle, the base portion having a top surface and a bottom surface, wherein the dressing member is positionable atop a wound to be closed in a pressure application configuration where the bottom surface is adapted to apply pressure to the wound to help stop bleeding of the wound, and wherein the wings are bendable relative to the base portion to a second angle to cause the base portion to apply pressure to the wound.

In another aspect of the invention, a method of treating a wound closure comprises providing a dressing member comprising an at least partially hard or rigid body, the body comprising a base portion and one or more wings extending upwardly from the base portion, the base portion having a top surface and a bottom surface, positioning the dressing member atop a wound to be closed in a pressure application configuration where the bottom surface is positioned to apply pressure to the wound to help stop bleeding of the wound, and after a period of time, positioning the dressing member atop the wound to be closed in a protection configuration where the top surface faces the wound so that the dressing member protects the wound during healing.

In another aspect of the invention, a method of treating a wound closure comprises providing a dressing member comprising an at least partially hard or rigid body, the body comprising a base portion and one or more wings extending upwardly from the base portion, the base portion having a top surface and a bottom surface, positioning the dressing member atop a wound to be closed in a pressure application configuration where the bottom surface is positioned to apply pressure to the wound to help stop bleeding of the wound, and after a period of time, positioning the dressing member atop the wound to be closed in a protection configuration where the top surface faces the wound so that the dressing member protects the wound during healing, wherein the step of positioning the dressing member atop a wound to be closed further comprises applying pressure to the dressing member by bending the one or more wings so that the bottom surface applies pressure to the wound.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a wound closure treatment system. In particular, the invention relates to a system and method for treating a wound closure to help stop bleeding and/or to protect the wound closure site from reopening. Although the invention is illustrated and described in the context of being useful for wound closure treatment, the present invention can be used in other ways, as would be readily apparent to those of ordinary skill in the art. Accordingly, the present invention should not be limited just to the examples and embodiments described herein.

Figure 1A:
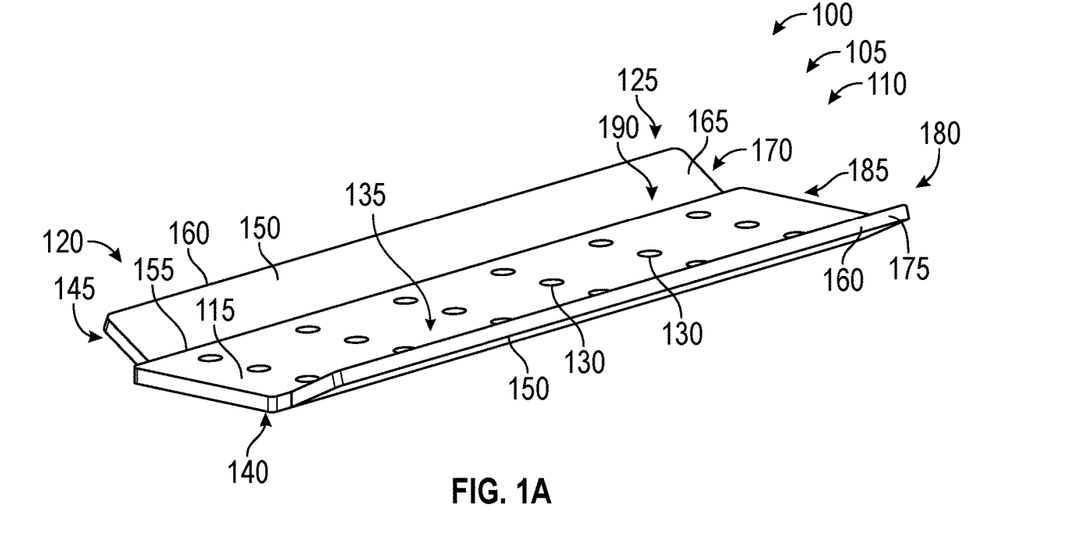
FIG. 1A is a schematic side perspective view of a wound closure treatment system according to the invention.
Figure 1B:
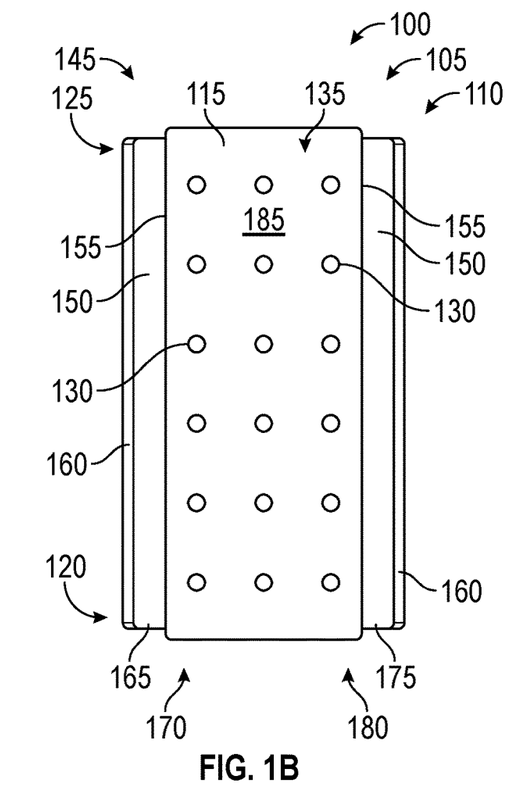
FIG. 1B is a schematic top view of the wound closure treatment system of FIG. 1A.
Figure 1C:
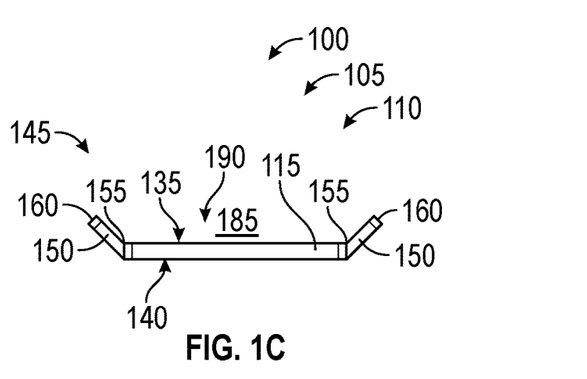
FIG. 1C is a schematic side view of the wound closure treatment system of FIG. 1A.

FIGS. 1A, 1B, and 1C show perspective, top, and side views, respectively, of a wound closure treatment system 100 according to one version of the invention. The wound closure treatment system 100 includes a dressing member 105 made up of a body 110. The body 110 of the dressing member 105 includes at least a portion that is substantially hard and/or rigid. By hard it is meant that the hard portion of the body 110 is sufficiently hard to offer some protection to soft tissue the dressing member 105 is in contact with, covers, or is in proximity to. By rigid it is meant that the rigid portion of the body 110 is sufficiently rigid to not deform under its own weight in normal atmospheric conditions of use. The body 110 of the dressing member 105 includes a base portion 115 that extends from a first end 120 of the dressing member 105 to a second end 125 of the dressing member 105. The base portion 115 may optionally have one or more holes or openings 130 that extend through the base portion 115 from a first or top surface 135 of the base portion 115 to a second or bottom surface 140 of the base portion 115. The one or more holes or openings 130 are sized and shaped to allow air to pass through the base portion 115 without substantially altering the structural integrity of the base portion 115. The base portion 115 may be a plate or plate-like structure and may be substantially flat or planar. Alternatively, the base portion 115 can be non-planar and/or bendable or moldable into a non-planar shape, as will be described. As shown in the top view of FIG. 1B, the base portion 115 can have a rectangular shape in one version. Alternatively, the shape can be any other shape, such as square, triangular, polygonal, rounded, circular, oval, ovoid, or the like or any combination thereof in order to suit a particular wound closure site, as will also be described. The wound closure treatment system 100 can include the dressing member 105 alone, in one or more parts or pieces, or can include the dressing member 105, in one or more parts or pieces, combined with any of the additional features or items disclose herein.

The wound closure treatment system 100 of the invention can be used to treat a wound that has had a wound closure applied and/or a wound that is in need of closure. Examples of wounds that need to be closed include abrasions, lacerations, avulsions, punctures, and incisions. The wound closure can be a wound closure that is applied by a physician or other medical caregiver in a medical environment, such as an emergency room, operating room, urgent care facility, clinic, doctor's office, or the like. It can also be a wound closure that is applied in a medical situation away from a medical facility, such as by an emergency medical technician at or in route from an accident or by a medic or other caregiver on a battlefield or by a sports trainer, coach, or the like at a sporting event. The wound closure can also be for a less severe wound that is tended to at home, at an office or school, or in any non-medical environment, in which case the caregiver can be a parent, teacher, nurse, friends, or the like, or the patient him or herself. The wound that is to be closed and treated by the wound closure treatment system 100 can be a wound that occurs by accident, such as during a traumatic event, or can be a wound that occurs intentionally, such a during surgery or removal of a lesion or the like. The most common example of wound closure system for closing wounds that will not easily heal on their own is the application of sutures, which can be absorbable, typically monocryl, vicryl (polygalactin 910), polyester poly(p-dioxanone), collagen, or chromic gut, or non-absorbable, typically nylon, silk, polypropylene, or steel. Other types of wound closure systems for these types of wounds include staples and adhesives, such as cyanoacrylate adhesive. Less severe wounds will often heal on their own or with the assistance of a bandage, tape, or compressive tape, such as butterfly tape. Though at times exemplified and discussed herein in the context of being used with sutures and staples, the present wound closure treatment system 100 is useful with any of these type of wound closures, including those with or without a wound closure system, for any would where there is a desire to help stop or prevent bleeding and/or a desire to protect the wound closure from reopening.

As shown in FIGS. 1A, 1B, and 1C, the body 110 of the dressing member 105 of the wound closure treatment system 100 includes an upwardly extending portion 145. In the version shown, the upwardly extending portion 145 comprises one or more upwardly extending wings 150. The one or more wings 150 are portions of the dressing member 105 that extend from one of more sides of the base portion 115 of the body 110 of the dressing member 105 or from another part of the base portion 115. The one or more wings 150 each extend from a first end 155 that is connected to or near the base portion 115 to a second end 160 that represents the distal end or extent of the wing 150. The one or more wings 150 extend upwardly out of a plane formed substantially by the base portion 115 of the body 110. By "out of a plane formed substantially by the base portion" it is meant that the one or more wings 150 extend at least partially in an upward direction so that the second end 160 of each wing 145 is at a position or is locatable at a position that is above and out of a plane formed by the top surface 135 of the base portion 115 when the top surface 135 of the base portion 115 is planar. In the case where the top surface 135 of the base portion 115 is non-planar, the second end 160 of each wing 145 extends to an upward height higher than an average height of the top surface 135, or to a height higher than the highest height of the top surface 135, or to a height higher than the corresponding height of the top surface 135 lengthwise along the body 110. In the specific version of FIGS. 1A, 1B, and 1C, the upwardly extending portion 145 includes a first wing 165 extending from a first side 170 of the base portion and a second wing 175 extending from a second side 180 of the base portion 115. In the version shown, the first side 170 and the second side 180 are longitudinally ending sides that are opposite one another. Alternatively or additionally, a wing 150 can be provided on one or both of the first end 120 and second end 125 of the base portion 115. Together the one or more wings 150 and the top surface 135 of the base portion 115 define a space or cavity 185 above the top surface 135. The space or cavity 185 has an open top 190 opposite the top surface 135. In the version shown, the upwardly extending portion 145 is made up of one or more sets of two wings 150 that are opposed to one another. This creates a generally U-shaped cavity 185 in cross-section.

Figure 2A:
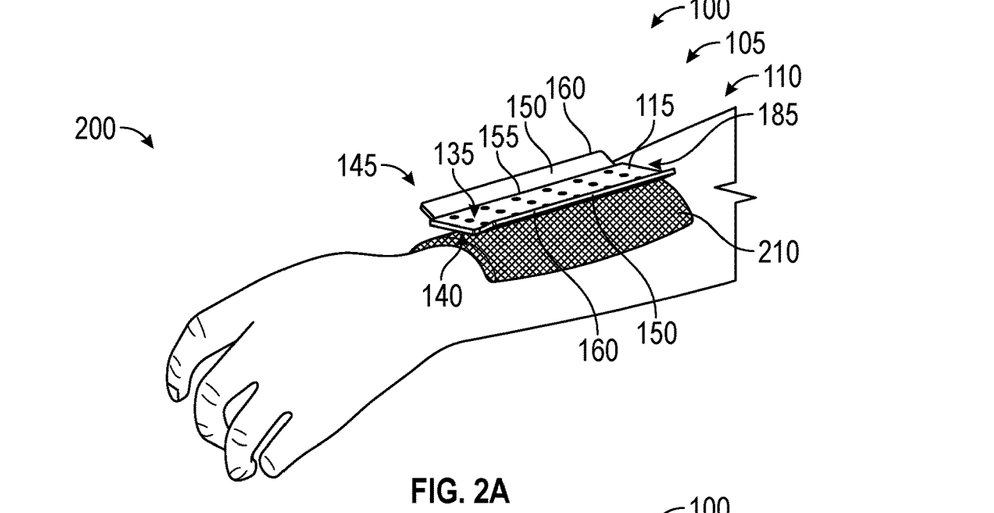
FIG. 2A is a schematic side perspective view of the wound closure treatment system of FIG. 1A in use in a first step of a pressure application configuration process.
Figure 2B:
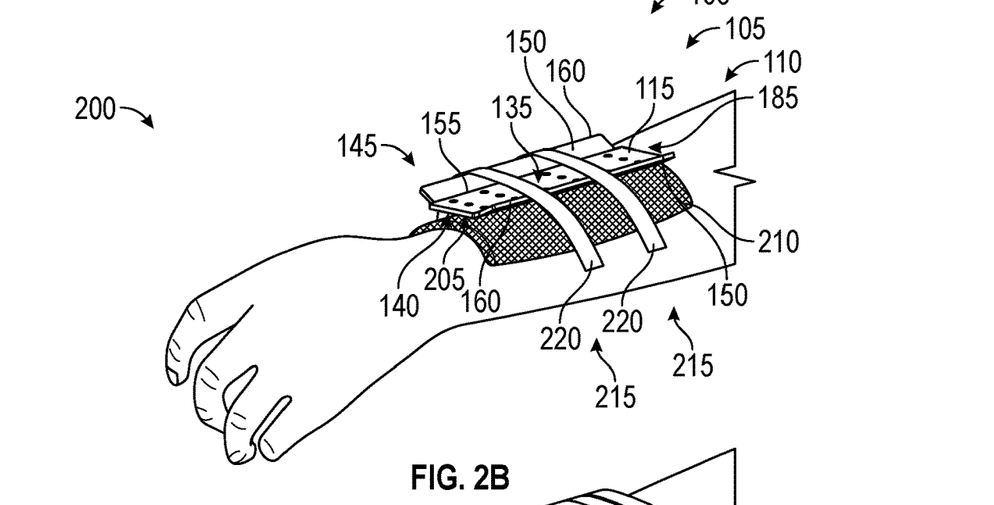
FIG. 2B is a schematic side perspective view of the wound closure treatment system of FIG. 1A in use in a second step of a pressure application configuration process.
Figure 2C:
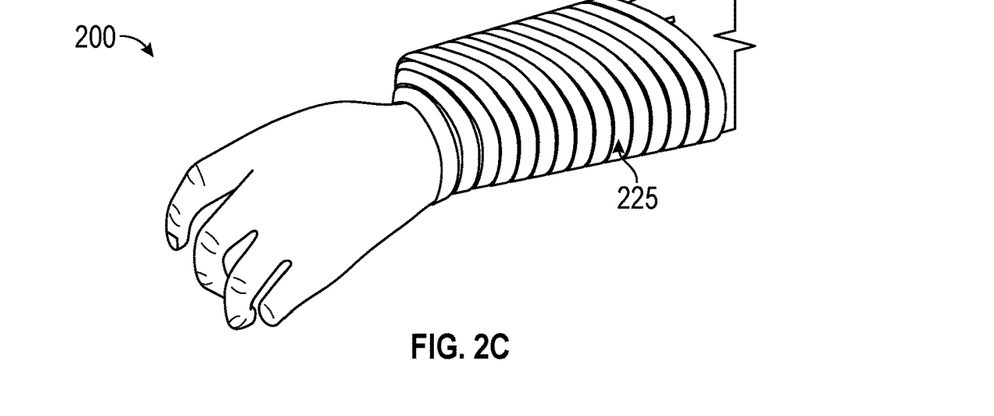
FIG. 2C is a schematic side perspective view of the wound closure treatment system of FIG. 1A in use in a third step of a pressure application configuration process.

FIGS. 2A, 2B, and 2C show the wound closure treatment system 100 being used in a pressure application configuration 200. In the wound closure pressure application configuration 200, the bottom surface 140 of the body portion 115 comprises a wound closure pressure application surface 205. The wound closure pressure application surface 205 can be used to apply pressure to a wound closure site before or soon after a wound has been closed to help the wound stop bleeding. The wound can either be severe wound that needs the application of a wound closure system to close or can be a less severe wound, such as a cut or laceration that does not need sutures but that has a tendency to bleed an uncomfortable amount. To use the wound closure treatment system 100 in its pressure application configuration 200, the dressing member 105 is positioned so that the bottom surface 140 of the base portion 115 faces a wound closure that is to be treated. The dressing member 105 is then placed atop the wound closure either directly or with one or more layers of gauze 210 positioned between the wound closure and the bottom surface 140 of the body portion 115, as shown in FIG. 2A. Next, as shown in FIG. 2B, one or more pressure applicators 215 are used to apply downward pressure to the wings 150, such as to the second ends 160 of the wings 150, as shown. The pressure that is applied to the wings 150 is transferred to the bottom surface 140 of the body portion 115 which in turn applies pressure to the wound and/or the wound closure. In the version of FIG. 2B, the pressure applicators 210 are one or more strips of adhesive tape 220, which can be elastic or inelastic, that are stretched across the dressing member 105 and attached to the patient on opposite sides of the wound closure in a manner that draws the dressing member 105 towards the wound closure. Then, as shown in FIG. 2C, the wound closure treatment system 100 made up of the dressing member 105 and the pressure applicators 215 can optionally be wrapped in an elastic or non-elastic wrap 225 to help secure the wound closure system 100 in place. Alternatively, the one or more strips of tape 220 can be removed and the elastic wrap 225 itself can serve as the pressure applicator 210.

In a particular version in accordance with the method of FIGS. 2A, 2B, and 2C, the wound closure system 100 can be used after sutures or other similar type of wound closure system has been applied to a wound. For example, prior to the application of the dressing member 105 above the wound closure site, a wound can be closed by a physician or caregiver suturing, stapling, or applying adhesive to the wound. The gauze 210 is then applied over the closed wound and then the dressing member 105 is applied over the gauze 210 as shown in FIG. 2A. Alternatively, for a wound that is not as severe, the wound can be initially closed by a bandage or merely the gauze or the dressing member itself directly onto the closure. In the later case, it would generally be advisable to sterilize the dressing member 105 or have it packaged in a sterile condition.

The wound closure treatment system 100 in its use in the pressure application configuration advantageously applies pressure at the wound closure site where it is needed. As a result, there is less uncomfortable pressure being applied to parts of the patient where it is not needed. For example, the need to tightly apply elastic wrap is no longer necessary. In the past, the wrap 225 would need to be applied so tightly so that there is pressure or compression at the wound closure site, and this could result in a discomfortable squeezing of the arm or other extremity or body part. Now, with the wound closure treatment system 100 of the invention, less total pressure can be applied while still providing adequate and/or improved pressure to the wound closure site because the pressure is being directly applied directly to the site. In addition, the wound closure treatment system 100 of the invention provides the advantage that a patient does not have to press down on the gauze and wound closure with the hand or fingers for long and stressful minutes to stop excessive bleeding. The pressure is automatically done for the patient.

The wings 150 serve to help apply the pressure to the wound closure site in a directional manner. By having the second ends 160 of the wings 150 elevated above the base portion 115 and by applying the force to the second ends 160 of the wings 150, the pressure is applied in a downward direction toward the wound closure site. This directional application can further help to reduce the overall pressure that is needed to be applied to help stop or prevent bleeding at the wound closure site.

Referring back to FIGS. 1A, 1B, and 1C, in one version, the wings 150 in addition to extending upwardly, also extend outwardly from the base portion 115 of the body 110 of the dressing member 105. By extending outwardly, the wings 150 can create a larger space or cavity 185 above the top surface 135 and/or a more comfortable arrangement of the wings 150, as will be explained. The angular orientation of the wings 150 relative to the base portion 115 and/or relative to a horizontal plane when the dressing member 105 is positioned upright can range from about 10 degrees to about 135 degrees, or from about 10 degrees to about 90 degrees, or from about 10 degrees to about 85 degrees or about 20 degrees to about 80 degrees.

Figure 3A:
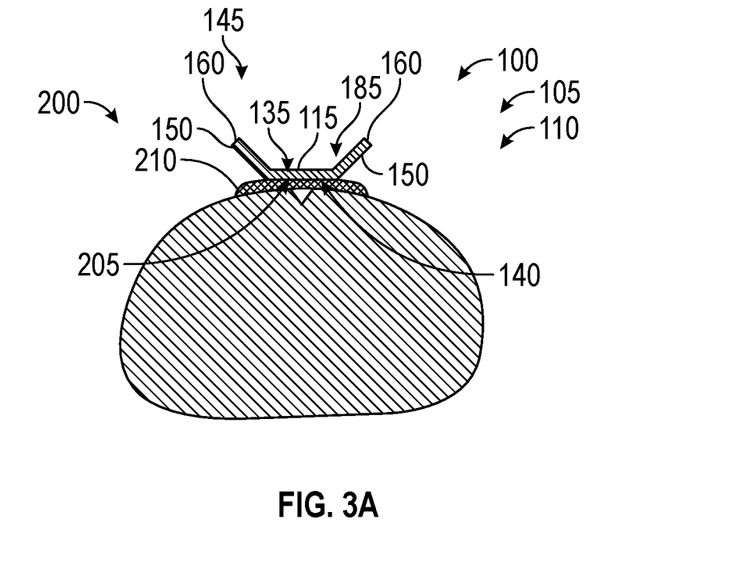
FIG. 3A is a schematic partially sectional view of a version of a wound closure treatment system in the position of FIG. 2A.
Figure 3B:
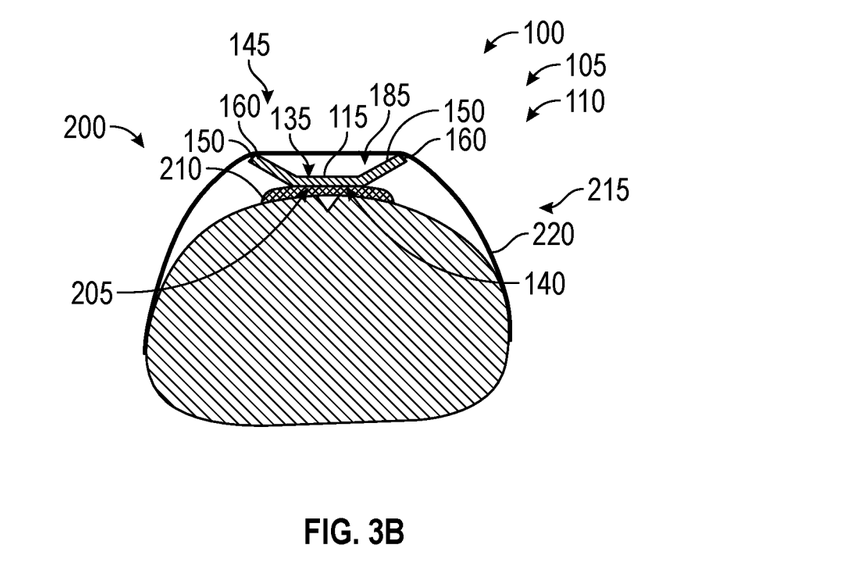
FIG. 3B is a schematic partially section view of the version of a wound closure treatment system of FIG. 3A in the position of FIG. 2B.

In one particular version, such as the one shown in FIGS. 3A and 3B, the wings 150 are designed to be deformable under the pressure applied by the pressure applicators 215. FIG. 3A shows the wound closure treatment system 100 of this version when in a similar position as FIG. 2A where no pressure is yet applied. In this unpressured condition, the wings 150 extend outwardly from the body portion 115 at a first angle. FIG. 3B shows the wound closure treatment system 100 after the pressure applicators 215 have been applied. As can be seen, the wings 150 are deformed or bent downward so that they now extend at a second smaller angle from the body portion 115. In this version, the biasing of the wings 150 downward causes the wings 150 to exert a downward pressure on the body portion 115 and thus allowing the bottom surface 140 to exert pressure or compression on the wound closure site. With this version, a physician or caregiver that is applying the dressing member 105 to compress a wound closure site can judge from the bending of the wings approximately how much pressure is being applied to the wound closure site. This helps the physician or caregiver to know that an adequate or desired amount of pressure or compression is being applied. The angles of the wings 150 can be determined based on the material properties and thicknesses of the materials used. In one version, the undeformed wings 150 can extend at an angle relative to the base portion 115 and/or relative to a horizontal plane when the dressing member 105 is positioned upright can range from about 30 degrees to about 75 degrees, or from about 40 degrees to about 50 degrees, and can deform from about 5 to about 30 degrees or from about 10 to about 20 degrees. In one particular version, the wings 150 are angled at about 45 degrees and are bendable in use to about 30 degrees.

The wound closure treatment system 100 can be maintained in use in its pressure application configuration 200 until the bleeding has stopped and/or until the wound closure has started to heal. The period of time for the wound closure treatment system 100 to remain in the pressure application configuration 200 will depend on the severity of the wound and the bleeding condition. In general, the wound closure treatment system 100 can be left in the pressure application condition for from a few hours to a few days, and more from about 1 day to about 2 or 3 days. While the wound closure treatment system 100 is in the pressure application configuration, the wound closure treatment system 100 will also serve a protective role due to the body portion 115 being sufficiently hard to offer such protection. Thus, the effects of any knocks or blows to the area of the wound closure will have a lessened impact on the wound and wound closure than if the hard body portion 115 were not covering the wound site.

Figure 4A:
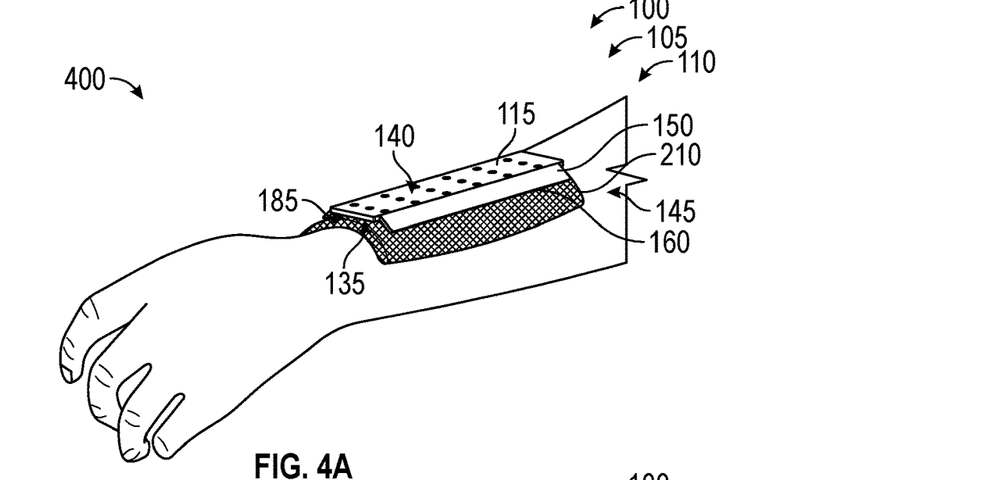
FIG. 4A is a schematic side perspective view of the wound closure treatment system of FIG. 1A in use in a first step of a protection configuration process.
Figure 4B:
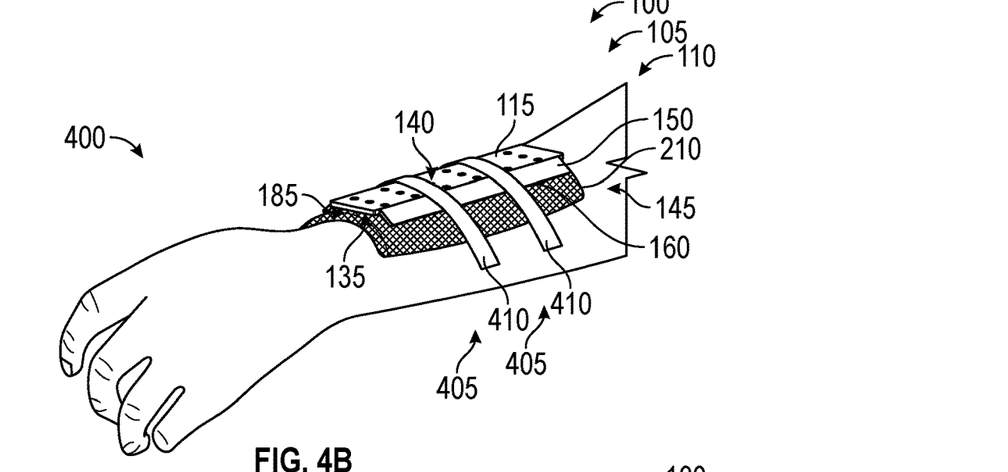
FIG. 4B is a schematic side perspective view of the wound closure treatment system of FIG. 1A in use in a second step of a protection configuration process.
Figure 4C:
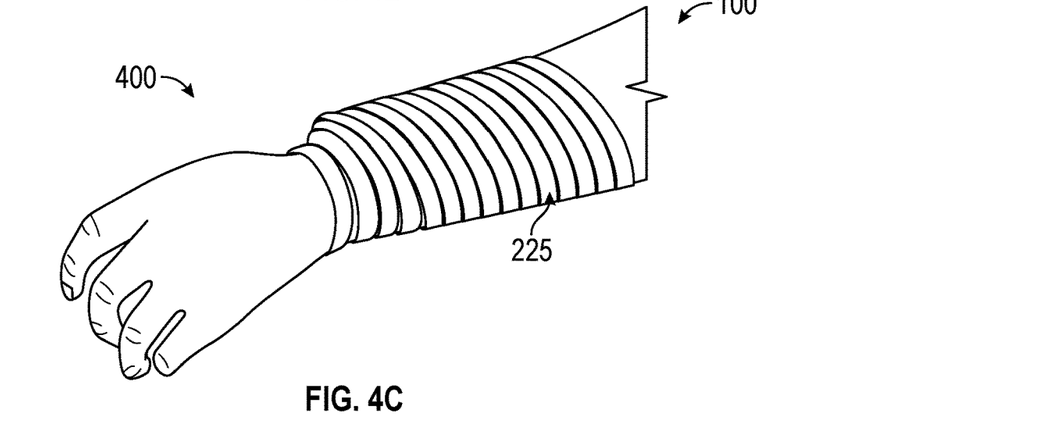
FIG. 4C is a schematic side perspective view of the wound closure treatment system of FIG. 1A in use in a third step of a protection configuration process.

In one version of the invention, the wound closure treatment system 100 has a second use that helps protect the wound closure during the healing process. Once healing has begun, the wound closure treatment system 100 can be moved from its pressure application configuration 200 to a protective configuration 400 as shown in FIGS. 4A, 4B, and 4C. In the protective configuration 400, the dressing member 105 is flipped over so that the top surface is facing the wound closure site. As will be clear, if the wound is on an undersurface of a patient, "top surface" will be pointing down in the pressure application configuration 200 and pointing up in the protective configuration 400. The use of "top" is merely used to identify the surface that is opposite the pressure application surface 205 and/or is on the side of the one or more upstanding wings 150.

In use when the wound closure treatment system 100 is positioned in the protective configuration 400, the dressing member 105 is positioned over the wound closure site so that the space or cavity 185 formed by the top surface 135 and the one or more wings 150 is positioned above the wound closure site. The wound closure site is thus covered and at least partially surrounded by the wings 150 and the base portion 115. The base portion 115 can either not contact the wound closure site at all or can contact the site with only slight pressure. This allows healing to occur with minimal disturbance. In the protection configuration 400, the wound closure system 100, by nature of its hard body, offers protection for the wound closure site and helps prevent inadvertent contact with the wound closure site from adversely affecting the healing process. By allowing for space and/or a reduction in pressurized contact, a direct blow to the patient in the area of the wound closure will have reduced impact on the wound closure and will be less likely to adversely affect healing and popping open of the wound.

The body 110 of the dressing member 105 can be made of any material suitable to provide the hardness and/or rigidity desired. For example, the body 110 can comprise one or more of metal or plastic, and in one version is made of moldable biocompatible plastic, such as one of more of a polycarbonate, a polypropylene, a polyethylene, a polyvinylchloride, an acrylonitrile butadiene styrene, a polystyrene, a polyethylene terephthalate glycol, a polymethyl methacrylate, and the like. The material can be clear, partially clear, or opaque, as desired, but in one particular version the material is sufficiently clear or transparent to allow a patient, physician or caregiver to be able to view when gauze 210 needs to be replaced or the wound otherwise tended to. In one particular version, the dressing member 105 can have an average thickness of from about 0.01 inches to about 0.1 inches or from about 0.02 inches to about 0.065 inches, and in one particular version is about 0.03 inches. The thicknesses can change depending on the selected material and on the desired hardness and/or rigidity. The dressing member 105 can come in an assortment of lengths and/or widths to suit different sized or shaped wounds. Alternatively, the dressing member 105 can come in one long length that can be cut or broken into a smaller size by either using a tool, such as scissors, or by tearing it along scores or perforations. In one version, the base portion is about 1.5 inches to 2 inches wide to allow it to extend beyond the width of the wound, but this width can be more or less depending on the wound. In one particular version, the height of the wings 150 extends to at least about 0.5 inches and on one version is about 0.75 inches. The openings 130, if provided, an have any suitable size or shape to allow for the passage of air therethrough. Alternatively or additionally, channels or ridges can be provided on the base portion 11 to allow air to circular. The base portion 115 can be planar or substantially planar, as discussed above. Alternatively, the base portion 115 can be convex or concave or bowl shaped.

The wound closure treatment system 100 can be provided in any suitable size or shape for an particular type of wound. For example, the version of the wound closure treatment system 100 of FIGS. 1A, 1B, and 1C is particularly useful in treating wounds on extremities, such as the arm or leg. Smaller versions can be used to treat wounds on the fingers or toes. In another version, the wound closure treatment system 100 can be shaped or contoured for a specific region of application, such as a hand, foot, knee, face, nose, and/or scalp. In another version, the base portion 115 can be made of moldable material, such as material that can be placed in hot water and then easily reshaped and then hardened again when cooled. In another version, the dressing member 105 can be made of fiberglass or cast material other moldable material and can be molded to fit the contour of a particular body part.

Figure 5A:
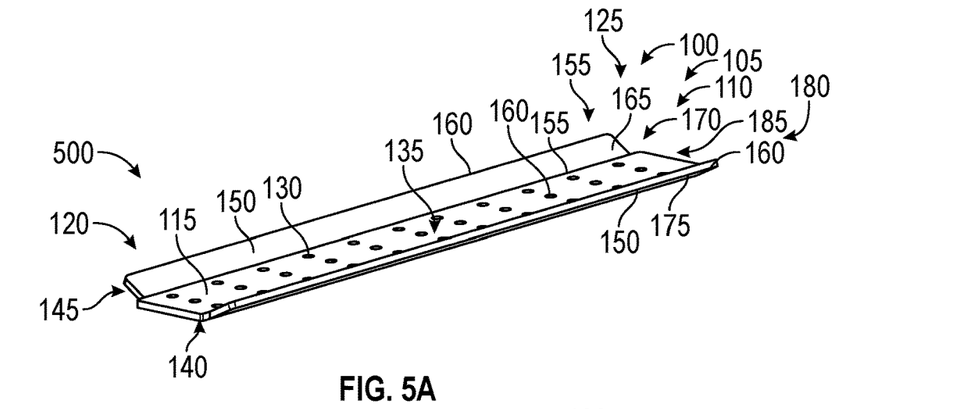
FIG. 5A is a schematic side perspective view of another version of a wound closure treatment system.
Figure 5B:
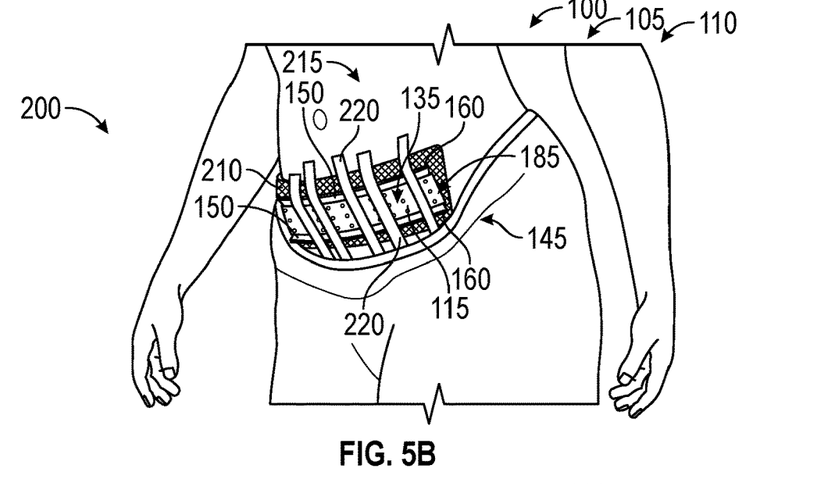
FIG. 5B is a schematic side perspective view of the wound closure treatment system of FIG. 5A in use in a pressure application configuration.
Figure 5C:
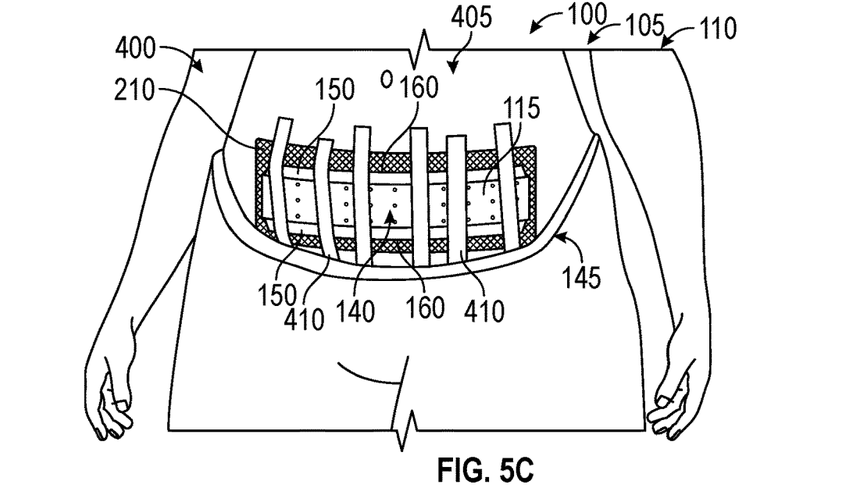
FIG. 5C is a schematic side perspective view of the wound closure treatment system of FIG. 5A in use in a protection configuration.

FIG. 5A shows a version of a wound closure treatment system 100 that designed for a particular purpose or region. The version of FIG. 5A is a C-section closure treatment system 500 particularly useful in treating a C-section opening in a woman following a Cesarian childbirth procedure. A C-section opening can be a challenge to stop bleeding and/or to heal because of the difficulty in applying pressure to the area on the woman's torso. The site is also located in a region near organs that have recently gone through the trauma of childbirth. Following the conventional suturing or stapling of the C-section opening, a physician or caregiver can position the C-section closure treatment system 500 in a pressure application configuration 200 over the opening, as shown in FIG. 5B. After some time has passed, such as one or two days, the C-section closure treatment system 500 can be flipped over to its protection configuration 400, as shown in FIG. 5C to protect the opening as it continues to heal. The body portion 115 of the C-section closure treatment system 500 can be sufficiently long to cover at least a majority of the C-section wound and preferably long enough to cover the entire length or slightly more than the entire length of the C-section wound. Accordingly, in one version, the length of the body portion 115 of the C-section closure treatment system 500 is from about 3 inches to about 8 inches, or from about 4.5 inches to about 6.5 inches. In one version, the base portion 115 of the C-section closure treatment system 500 is rigid but bendable under reasonable manual force so that the physician or caregiver can shape the base portion 115 into a desired shape to contour to the shape of the patient. In another version, the base portion 115 in the version can be made of moldable and/or contourable material, as discussed above.

Figure 6A:
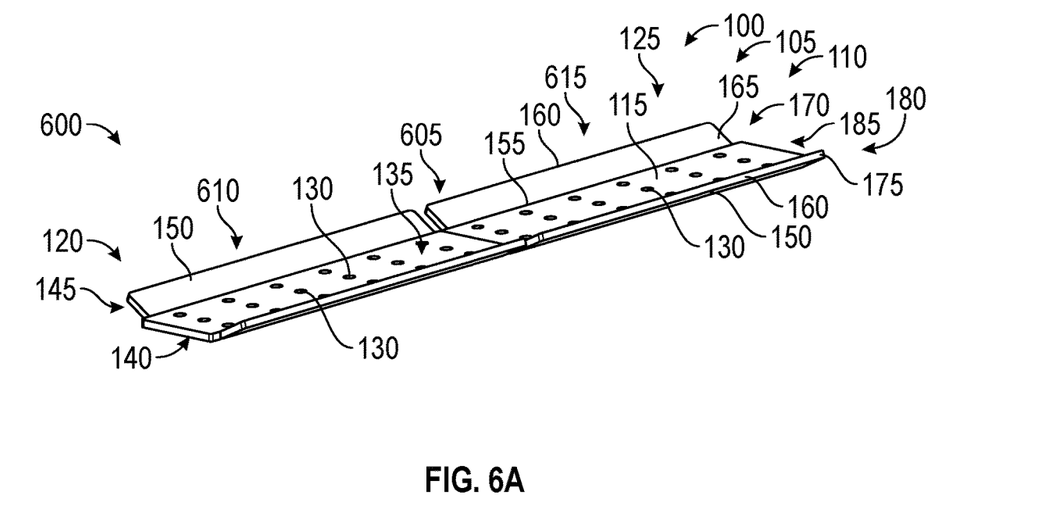
FIG. 6A is a schematic side perspective view of another version of a wound closure treatment system.
Figure 6B:
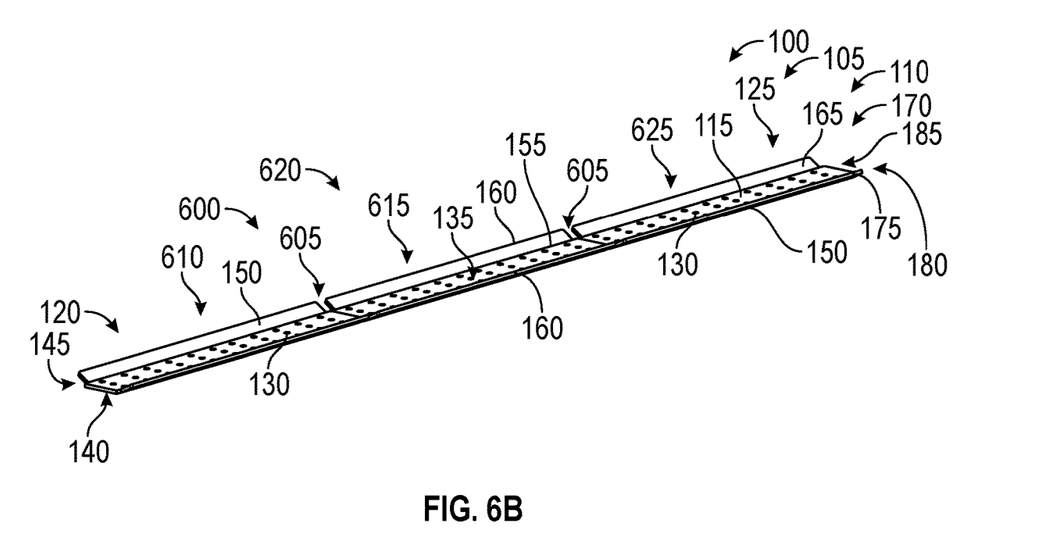
FIG. 6B is a schematic side perspective view of another version of a wound closure treatment system.

In another version, as shown in FIG. 6A, the wound closure treatment system 100 is an easily moldable wound closure treatment system 600 and includes one or more bendable regions 605 that separate a first rigid section 610 and a second rigid section 615. The bendable regions 605 are designed to be less rigid than the first rigid section 610 and the second rigid section 615 so that the first rigid section 610 can be bent relative to the second rigid section 615. The bendability of the bendable region 605 can be achieved in any manner, such as by one or more of providing a break in the one or more wings 150, reducing the thickness of material in the bendable region 605, and providing scores along a line. In the version shown, the bendability is provided by both a break in the one or more wings 150 and by a reduction of the thickness of the material. In one version, the bendable region 605 is sufficiently thick and/or rigid to maintain the shape it is bent into. FIG. 6B shows an easily moldable C-section closure treatment system 620 that includes a second bendable region 605 that separates the second rigid section 615 from a third rigid section 625. When there are multiple bendable regions 605, each bendable region 605 can be substantially the same or different, depending on the application desired.

Figure 7A:
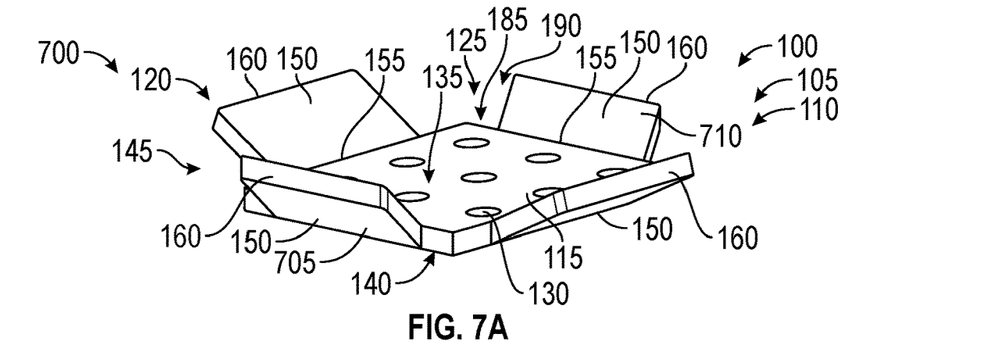
FIG. 7A is a schematic side perspective view of another version of a wound closure treatment system.
Figure 7B:
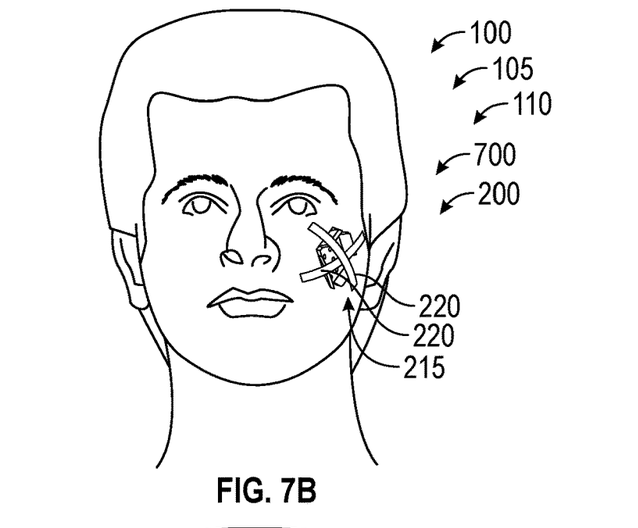
FIG. 7B is a schematic side perspective view of the wound closure treatment system of FIG. 7A in use in a pressure application configuration.
Figure 7C:
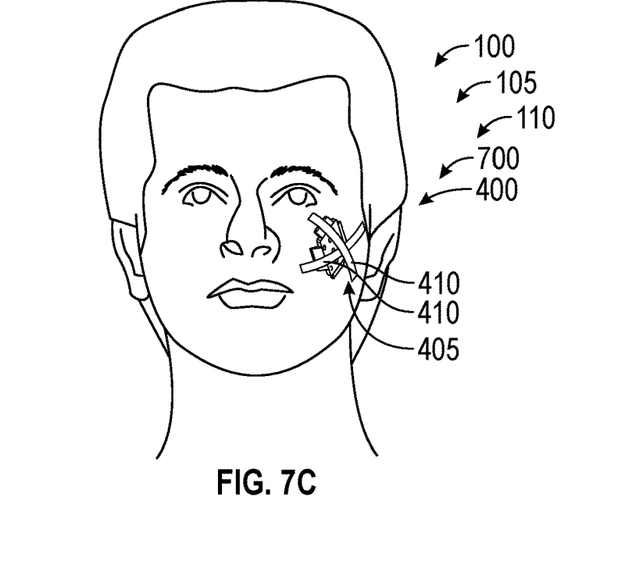
FIG. 7C is a schematic side perspective view of the wound closure treatment system of FIG. 7A in use in a protection configuration.

FIG. 7A shows a version of a wound closure treatment system 100 that is a small wound closure treatment system 700 particularly useful in treating small wounds, circular wounds, punctures, and gunshots wounds. The small wound closure system in the version shown has a substantially square body portion 115 but can have any desired shape. In the version show, the upwardly extending portion 145 is made up of multiple sets of two wings 150 that are opposed to one another. For example, as can be seen in FIG. 7A, a first set of opposed wings is provided as with the version of FIG. 1A. In addition, a second set of opposed wings 150 made of first end wing 705 and second end wing 710 is also provided. The small wound closure system 700 is particularly useful for small puncture type wounds that are deep enough and/or of large enough area that they can be difficult to stop from bleeding. The small wound closure system 700 is also particular used for treating wounds on the head or face, as shown in FIGS. 7B and 7C which show the small wound closure system 700 in its pressure application configuration 200 and its protection configuration 400, respectively, or other areas of a body where pressure application is difficult. The small wound closure treatment system 700 is also particularly useful for treating wounds cause by Mohs surgery or other removal of skin lesions or moles. As can be seen, the second set of opposed wings 150 allows for an cross-configuration application of the pressure applying tape in the pressure application configuration 200 which more evenly applies pressure to the small wound. In addition, in the protection configuration 400, the extra set of wings 150 provides more surrounding protection to the small wound. The arrangement and design of FIG. 7A is not limited to small wounds and can be used in larger wound closure treatment system versions as well.

Figure 8A:
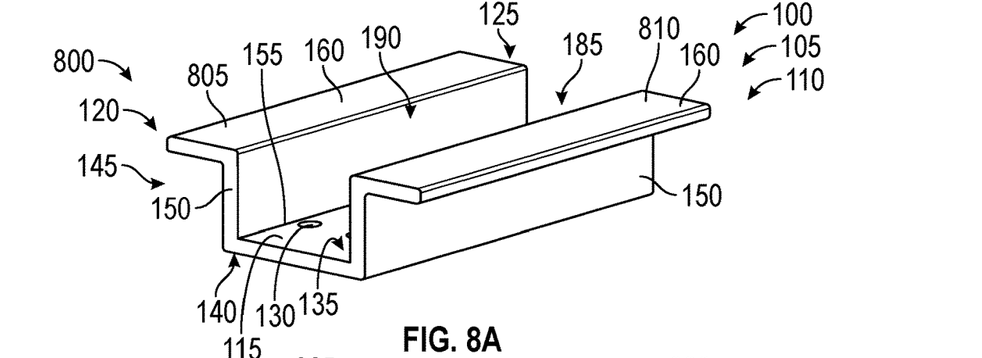
FIG. 8A is a schematic side perspective view of another version of a wound closure treatment system.
Figure 8B:
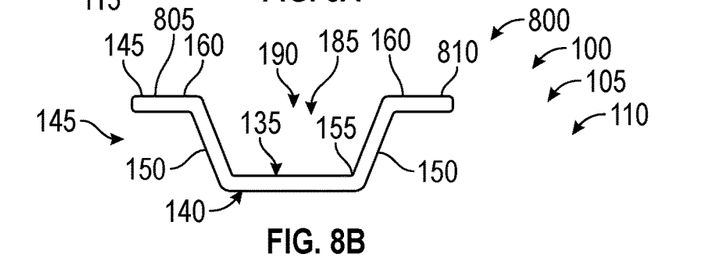
FIG. 8B is a schematic side view of the wound closure treatment system alternative to the version of FIG. 8A.
Figure 8C:
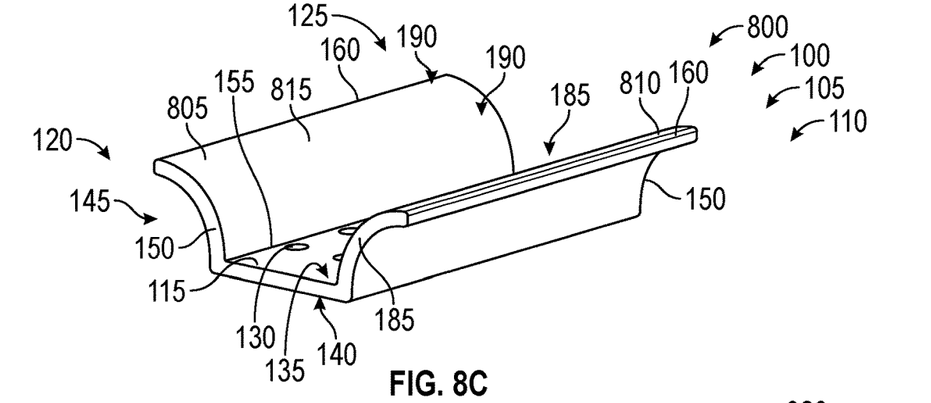
FIG. 8C is a schematic side perspective view of another version of a wound closure treatment system.

FIG. 8A shows a bent wing wound closure treatment system 800 of the invention. The system of FIG. 8A is similar to the version of FIGS. 1A, 1B, and 1C with one wing 150 having a bent member 805 and another wing 150 having an oppositely bent member 810. The bend can be an approximately 90 degree L-shaped bend, as shown in the version of FIG. 8A. Alternatively, as shown in the version of FIG. 8B, the wings 150 can be both angled and bent. In another alterative version, as shown in FIG. 8C, the bend can be a gradual curvature 815 of the wings 150.

Figure 8D:
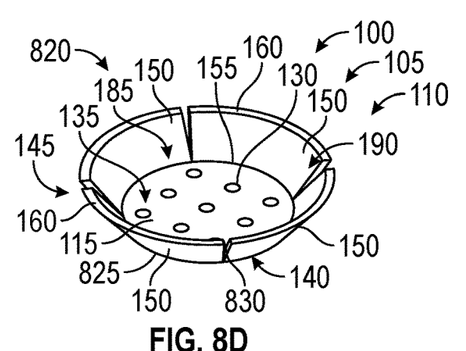
FIG. 8D is a schematic side perspective view of another version of a wound closure treatment system.
Figure 8E:
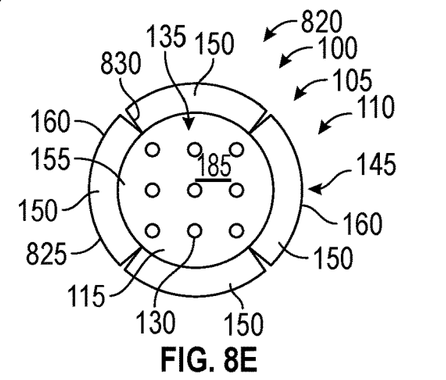
FIG. 8E is a schematic top view of the wound closure treatment system of FIG. 7D.

FIGS. 8D and 8E show a round wound closure treatment system 800 that is similar to the version of the small wound closure treatment system 700 of FIG. 7A but with a circular or other round shape body portion 115 and/or wings 150. In the version shown, the wings 150 include multiple round wings 825 optionally separated by slits 830 that allow for easier spreading of the round wings 825 in use. The round wound closure treatment system 800 can be attached by crossed tape, as shown in FIGS. 7B and 7C or by a single piece of tape.

In another version, the wound closure treatment system 100 has sterile pads or gauze pre-attached to the bottom surface 140 and/or the top surface 135 of the body portion 115 of the dressing member 105. This version is particularly useful for ambulance used and on battlefields in war zones. By having all components together wound closure pressure and subsequent protection by the hard dressing can be quickly applied on a just incurred serious wound like a gunshot by emergency medical technician and/or by soldier medic.

In another version, one or more wound closure treatment systems 100 can be provided with standard bandages or tape or in first aid kits for treating minor wounds at home, at school, in the office, or in any other non-medical environment. The dressing member 105 can serve as an accessory to be use in conjunction with standard bandages, gauze, and/or tape to treat a wound that is bleeding more than usual. With this version, too, the dressing member 105 can have gauze, pads or tape pre-attached.

It is also important to note that while the wound closure treatment system 100 in any and all of its versions described above has been shown as usable in its pressure application configuration 200 and then in its protection configuration 400, the wound closure treatment system 100 can be used in either configuration without being used in the other. For example, for a wound closure that is not bleeding excessively, the pressure application configuration 200 can be skipped and the wound closure treatment system 100 can be initially positioned in its protection configuration 400. Likewise, for a wound that needs to have bleeding controlled, the wound closure treatment system 100 can be initially used in its pressure application configuration 200 and then once bleeding is controlled can be discarded if the wound is not in a position where the protection configuration is needed or if the patient does not want to wear the system in the protection configuration 400 for some reason. The wound closure treatment system 100 provides the option of using the system in its pressure application configuration 200, its protection configuration 400, or both.

The wound closure treatment system 100 in any and all of its versions described above can also be used in manners other than for wound closure treatment. For example, the wound closure treatment system 100 can be used to apply pressure to any part of the body in need of such pressure.

One such use would be the draining of puss or other liquid from a boil, abscess, infection, pimple or the like. In another use, pressure can be applied to a sore muscle.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/−ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A method of treating a wound closure, the method comprising:
   providing a dressing member comprising an at least partially hard or rigid body, the body comprising a base portion and one or more wings extending upwardly from the base portion, the base portion having a top surface and a bottom surface,
   positioning the dressing member atop a wound to be closed in a pressure application configuration where the bottom surface is positioned to apply pressure to the wound to help stop bleeding of the wound, and
   after a period of time, positioning the dressing member atop the wound to be closed in a protection configuration where the top surface faces the wound so that the dressing member protects the wound during healing,
   wherein the pressure applied to the wound in the protection configuration is less than in the pressure applied to the wound in the pressure application configuration.

2. A method according to claim 1 wherein the step of positioning the dressing member atop a wound to be closed further comprises applying pressure to the dressing member so that the bottom surface applies pressure to the wound.

3. A method according to claim 1 wherein the step of positioning the dressing member atop a wound to be closed further comprises applying pressure to the dressing member by bending the one or more wings so that the bottom surface applies pressure to the wound.

4. A method according to claim 1 wherein the step of positioning the dressing member atop a wound to be closed in a protection configuration comprises flipping the dressing member over from its pressure application configuration so that pressure is applied by the wings at a position other than the wound.

5. A method according to claim 1 wherein the one or more wings comprises a set of two wings opposed from one another, and wherein the two wings are on opposite sides of the wound in the protection configuration.

6. A method according to claim 1 wherein the one or more wings comprises a set of two wings opposed from one another to create a cavity defined by the set of wings and the top surface, wherein the cavity is positioned over the wound to be closed when the dressing member is in the protection configuration.

7. A method according to claim 1 wherein the one or more wings comprises a set of two wings opposed from one another to create a cavity defined by the set of wings and the top surface, wherein the cavity is positioned over the wound to be closed when the dressing member is in the protection configuration so that the wings can deliver pressure to an area other than directly to the wound.

8. A method according to claim 1 wherein the base portion is substantially planar and wherein the one or more wings extend upwardly out of the plane of the base portion.

9. A method according to claim 1 wherein the one or more wings extend at an angle relative to the base portion of from about 10 degrees to about 135 degrees.

10. A method according to claim 1 wherein the step of positioning the dressing member atop a wound to be closed in a pressure application configuration further comprises applying pressure to the dressing member so that the bottom surface applies pressure to the wound and wherein the pressure applicator comprises one or more strips of tape.

11. A method according to claim 1 wherein the step of positioning the dressing member atop a wound to be closed in a protection configuration further comprises securing the dressing member in positioning using one or more strips of tape.

12. A method of treating a wound closure, the method comprising:
   providing a dressing member comprising an at least partially hard or rigid body, the body comprising a base portion and one or more wings extending upwardly from the base portion, the base portion having a top surface and a bottom surface, wherein the top surface of the base portion and the one or more wings define a cavity, positioning the dressing member atop a wound to be closed in a pressure application configuration where the bottom surface is positioned to apply pressure to the wound to help stop bleeding of the wound, and positioning the dressing member atop the wound to be closed in a protection configuration where the cavity faces the wound so that the dressing member protects the wound during healing.

13. A method according to claim 12 wherein in the protection configuration, the wound closure is covered and at least partially surrounded by the one or more wings and the base portion.

14. A method according to claim 12 wherein the pressure applied to the wound in the protection configuration is less than the pressure applied in the pressure application configuration.

15. A method according to claim 12 wherein the one or more wings comprises a set of two wings opposed from one another, and wherein the two wings are on opposite sides of the wound in the protection configuration.

16. A method according to claim 12 wherein the step of positioning the dressing member atop a wound to be closed further comprises applying pressure to the dressing member so that the bottom surface applies pressure to the wound.

17. A method according to claim 12 wherein the step of positioning the dressing member atop a wound to be closed further comprises applying pressure to the dressing member by bending the one or more wings so that the bottom surface applies pressure to the wound.

18. A method of treating a wound closure, the method comprising:

providing a dressing member comprising an at least partially hard or rigid body, the body comprising a base portion and wings extending upwardly from the base portion, the base portion having a top surface and a bottom surface, wherein the wings extend from a first end that is connected to the base portion to a second end distal to the base portion, positioning the dressing member atop a wound to be closed in a pressure application configuration where the bottom surface is positioned to face the wound and apply pressure to the wound to help stop bleeding of the wound, and flipping the dressing member over so that the top surface and the second end of the wings are positioned to face the wound so that the dressing member protects the wound during healing.

19. A method according to claim 18 wherein when in the protection configuration, pressure is applied by the wings at a position other than directly to the wound.

20. A method according to claim 18 wherein the step of positioning the dressing member atop a wound to be closed further comprises applying pressure to the dressing member by bending the one or more wings so that the bottom surface applies pressure to the wound.

\* \* \* \* \*